United States Patent
Hartwig et al.

(10) Patent No.: US 10,999,080 B2
(45) Date of Patent: May 4, 2021

(54) DYNAMICALLY ANALYZING THIRD-PARTY APPLICATION WEBSITE CERTIFICATES ACROSS USERS TO DETECT MALICIOUS ACTIVITY

(71) Applicant: Okta, Inc., San Francisco, CA (US)

(72) Inventors: Marcus Hartwig, Redwood City, CA (US); Samer Fanek, San Francisco, CA (US); Thomas Belote, San Francisco, CA (US)

(73) Assignee: Okta, Inc., San Francisco, CA (US)

( * ) Notice: Subject to any disclaimer, the term of this patent is extended or adjusted under 35 U.S.C. 154(b) by 187 days.

(21) Appl. No.: 16/039,275

(22) Filed: Jul. 18, 2018

(65) Prior Publication Data
US 2019/0394049 A1    Dec. 26, 2019

Related U.S. Application Data

(60) Provisional application No. 62/689,026, filed on Jun. 22, 2018.

(51) Int. Cl.
| | | |
|---|---|---|
| *H04L 9/00* | (2006.01) | |
| *H04L 9/32* | (2006.01) | |
| *H04L 29/06* | (2006.01) | |
| *G06F 21/51* | (2013.01) | |

(52) U.S. Cl.
CPC ........... *H04L 9/3263* (2013.01); *G06F 21/51* (2013.01); *H04L 9/321* (2013.01); *H04L 63/0272* (2013.01); *H04L 63/0428* (2013.01); *H04L 63/12* (2013.01); *G06F 2221/2119* (2013.01)

(58) Field of Classification Search
CPC ..................................................... H04L 9/3263
USPC .......................................................... 713/156
See application file for complete search history.

(56) References Cited

U.S. PATENT DOCUMENTS

| | | | |
|---|---|---|---|
| 9,087,187 B1 | 7/2015 | Doane | |
| 2009/0240936 A1 | 9/2009 | Lambiase et al. | |
| 2010/0275024 A1* | 10/2010 | Abdulhayoglu | H04L 9/3263 713/175 |
| 2011/0239288 A1 | 9/2011 | Cross et al. | |
| 2015/0180908 A1* | 6/2015 | Dang | H04L 63/205 726/1 |
| 2017/0034168 A1 | 2/2017 | Wilson et al. | |

OTHER PUBLICATIONS

PCT International Search Report and Written Opinion, PCT Application No. PCT/US2019/035471, dated Sep. 25, 2019, 10 pages.

* cited by examiner

*Primary Examiner* — Christopher J Brown
(74) *Attorney, Agent, or Firm* — Fenwick & West LLP

(57) ABSTRACT

A verification server provides certificate verification services to users of third-party application sites. In some embodiments, a verifier component of a user's client device provides the verification server with a certificate of a third-party application site, and the verification server indicates whether the certificate is successfully verified. In response to successful verification, the verifier component of the user's client device takes an action such as permitting the user's credentials to be provided to the third-party application site. In some embodiments, verifier components of numerous client devices provide certificates to the verification server, based on which the verification server learns which certificates are valid for a given third-party application site.

12 Claims, 4 Drawing Sheets

ID

DYNAMICALLY ANALYZING THIRD-PARTY APPLICATION WEBSITE CERTIFICATES ACROSS USERS TO DETECT MALICIOUS ACTIVITY

RELATED APPLICATIONS

This application claims the benefit of Provisional Application No. 62/689,026, filed on Jun. 22, 2018, which is incorporated herein by reference.

FIELD OF ART

The present disclosure generally relates to the field of software applications, and more specifically, to verification of third-party application websites.

BACKGROUND

Many software applications are made available in web-based form, with application functionality being made available via web pages obtained over computer networks. In such cases, there is a risk that the web pages may be tampered with, such as having pages substituted by a malicious party. Even where secure protocols such as HTTPS/TLS/SSL are employed, techniques such as man-in-the-middle attacks can still be used to inject spurious information ultimately leading to compromised user information.

If, for example, a malicious party can clandestinely provide a user with a modified version of a third-party application login page, the malicious party may be able to obtain the user's username/password or other credentials, thereby obtaining access to the user's account on the third-party application. This problem is compounded if the user re-uses credentials on different services, so that the malicious third-party can (for example) also obtain access to a "master" service such as a single-sign on service that provides access to the user's account on numerous other applications, as well.

The figures depict embodiments of the present invention for purposes of illustration only. One skilled in the art will readily recognize from the following description that alternative embodiments of the structures and methods illustrated herein may be employed without departing from the principles of the invention described herein.

DETAILED DESCRIPTION

Figure 1:
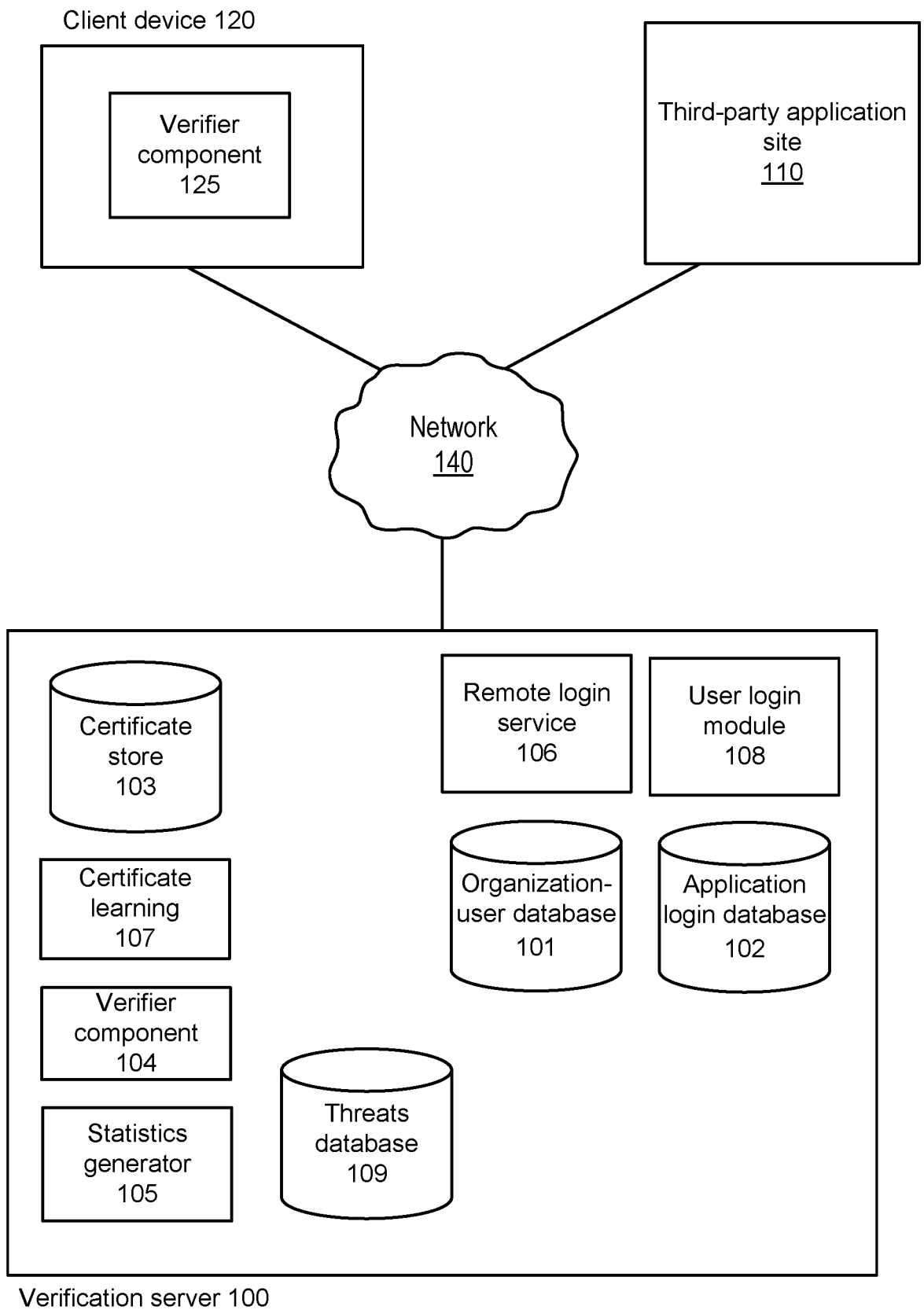
FIG. 1 illustrates one embodiment of a computing environment in which users use web-based third-party applications, and in which a server provides a verification service to ensure that third-party applications accessed by the user are legitimate.

FIG. 1 illustrates one embodiment of a computing environment in which users use web-based third-party applications available to that organization, and in which a server provides a verification service to ensure that third-party applications accessed by the user are legitimate.

Users use their client devices 120 (e.g., desktops, laptops, tablet computers, smartphones, or the like) to communicate directly or indirectly with third-party application sites 110 (e.g., SALESFORCE™, GOOGLE APPS™, or the like) to obtain pages of the application, such as for login to the application, for using functionality of the application, etc.

The client devices 120 have a verifier component 125 that verifies the third-party application sites 110, determining whether the certificates of the sites have been modified, and taking responses based on the verification (e.g., permitting submission of user credentials via the web pages of the third-party applications). In some embodiments, the verifier component 125 is authored by the organization responsible for the verification server 100. In some embodiments, the verifier component 125 is implemented as a browser plugin; in other embodiments in which the client device 120 has access to internet security data (e.g., TLS (Transport Layer Security) data), the verifier component is implemented as a security application that communicates with other applications.

The verification server 100 performs verification of third-party applications on behalf of client devices using the third-party applications, as described below.

The verification server 100 includes a certificate store 103 that stores representations of verified third-party application site certificates (e.g., X.509 or equivalent certificates) in association with an identifier of the third-party applications (e.g., their internet domains, such as www.salesforce.com). The certificate representations may differ in different embodiments. For example, in some embodiments, the certificate representations are hash values of the certificates of the third-party application sites 110, as computed by a hash function such as SHA (Secure Hash Algorithm). In other embodiments, the certificate representations are the original certificates themselves. In some embodiments, the certificate store 103 may include multiple verified certificates for a given third-party application; this allows for the use of proxy servers, A certificate learning module 107 of the verification server 100 populates the certificate store 103 based on certificate representations received from the verifier components 125 of multiple client devices 120. Obtaining the certificate representations from multiple client devices 120 (which are typically located in different locations, operating at different times, etc.) allows the certificate learning module to identify genuine certificates and screen out tampered-with or otherwise spurious certificates, given that in most instances at most only a small minority of certificates provided to client devices 120 are spurious. The certificate learning module 107 may employ different learning techniques in different embodiments. For example, in some embodiments the learning is rules-based, applying a predetermined rule, such as selecting (as the verified certificate representation for a given application) the certificate representation that is provided in at least some given percentage of instances (e.g., 95%), or at least some given number of times (e.g., 300 times), or the like. The certificate learning module 107 may be continuously run so as to keep knowledge of the certificates up-to-date, thereby accounting for changes in certificates over time.

The verification server 100 further includes a verifier component 104 that verifies that a given third-party application 110 is legitimate, using the certificate store 103. The verifier component 104 receives, from the verifier component 125 on the client device 120, an identifier of the third-party application and a representation of the certificate that stores representations of verified third-party application site certificates (e.g., X.509 or equivalent certificates) in association with an identifier of the third-party applications (e.g., their internet domains, such as www.salesforce.com). (The identifier of the third-party application may be included within the certificate itself, such as an X.509 subject name field, or it may be separate, such as the domain name portion of a URL of the third-party application site 110.) The verifier component 104 determines, for a given site certificate, whether a representation of the site certificate matches one of the verified cite certificate representations already stored in the certificate store in association with the third-party application corresponding to the site certificate. In some embodiments, if there is no match, then the verifier component 104 determines that the third-party application is not verified. In other embodiments, to accommodate situations in which the certificate learning module 107 has obtained too few certificates for the particular third-party application site 110 to be able to learn a verified certificate for that third-party application site, the verifier component 104 considers a given certificate to be verified if no verified certificate representations have yet been associated with the third-party application site 110. In some embodiments, the verification server 100 stores a set of trusted certificates (e.g., one set for each organization that uses the services of the verification server 100, or one set for each user), and upon a request to verify the certificate of a third-party application site 110, the verification server first checks whether the certificate is within the set of trusted certificates (e.g., for the current user, or the organization to which the current user belongs), and if so considers the certificate to be verified, only proceeding to check the certificates in the certificate store 103 if the certificate is not in the appropriate set of trusted certificates.

In some embodiments, the verification server 100 (e.g., the user login module 108 described below), or verifier component 125 of the client device 120, takes additional security measures, in addition to (or possibly instead of) the certificate verification of the verification performed by the verifier components 104 and 125. As a first example, in some embodiments the verifier component 104 populates a threats database 109 based on prior certificate verification failures, identifying and storing a set of geolocations of client devices 120 for which certification verification failed (e.g., within a particular recent timeframe, such as the past day) on some client devices. The verifier component 104 consults the threats database 109, comparing the geolocation of the client device 120 requesting certificate verification with those geolocations in the threats database; if the geolocation is found in the threats database 109 (e.g., within a given recent timeframe), then the verification server 100 enforces more stringent security measures, such as requiring multifactor authentication (MFA) before permitting the user of the client device 120 to be logged into the third-party application site 120 from which the certificate came.

As a second example, in some embodiments the verification server 100 stores, for each organization or user, a configurable security policy based on which the verifier component 125 may modify its behavior. For example, if the security policy for an organization mandates certificates of at least a certain security level (e.g., those with sufficiently long keylengths, certain issuers, or certain cryptographic algorithms), then the verifier component 125 will not permit the user of the client device 120 to logged into the third-party application site 110 associated with a certificate not meeting the given security level, regardless of whether the certificate would otherwise be successfully verified by the verifier component 104.

The verifier component 125 of the client device 120 takes actions in response to receiving a determination from the verifier component 104 of the server 100 of whether or not a given certificate is verified. For example, in some embodiments the verifier component 125 permits the client device 120 (e.g., a browser thereof) to submit credentials of the user to the third-party application site providing the certificate only if the certificate is determined to be verified; otherwise, the verifier component 125 does not permit the submission of such credentials, thereby protecting the credentials from possible theft or other misuse. Prevention of submission of credentials is accomplished in various ways in different embodiments, such as by modifying the document object model (DOM) of the login page of the third-party application site 110, e.g., by adding an overlay to the elements of the page to prevent page interaction, or changing the textual inputs of the login page to be read-only and the login or other credential submission button to be disabled, and/or by intercepting any outgoing web requests corresponding to the pages of the site 110. In some embodiments, the actions upon failure to verify a certificate include initiating the use of a virtual private network (VPN) connection in order to mitigate risk. More specifically, upon failure to verify a certificate the verifier component 125 initiates a VPN connection for its client 120 with a trusted server (e.g., the verification server 100, or a server of the organization to which the user of the client device 120 belongs) and uses the VPN connection for communication with the third-party application sites 110. To do so, the verifier component 125 may, upon failure to verify an application certificate, request establishment of a VPN connection and ensure that the VPN connection is active, communicate with the third-party application site 110 again, and if the certificate presented by the third-party application site 110 is verified, cease using the VPN connection for subsequent communications with the site 110 during that session.

In some embodiments, the actions of the verifier component 125 are determined using additional contextual data. As one example, in some embodiments the contextual data includes a location of the client device 120 at time of verification, such as a geolocation obtained from the client device itself (e.g., GPS coordinates) or derived from an IP address of the client device. Upon failure to verify a certificate of a third-party application site 120, the verifier component 125 identifies one or more location(s) associated with an organization to which the client device belongs (e.g., by consulting the organization-user database 101) and compares those locations to the location of the client device. If the location of the client device 120 corresponds to any of the identified locations of the associated organization, then the client device is presumably within the network of the organization, in which a man-in-the-middle proxy may be being legitimately used; accordingly, in such cases the actions of the verifier component 125 upon verification failure can be, for example, to provide a warning to a user of the client device about the verification failure but to nonetheless permit the client device to submit user credentials to the third-party application 110. In some embodiments, the verification server 100 associates locations with organizations by monitoring locations from which client devices 120 associated with the various organizations have accessed the verification server 100 in the past.

As another example, in some embodiments the contextual data includes a security level of the third-party application site 110 to which the client device 120 is logging in. For example, the verification server 100 may store, for different third-party application sites 110, an associated security level of that site, e.g., with each organization being able to specify its own security level for the sites 110. Upon failure to verify the certificate of an application site 110, the actions that the verifier component 125 takes are based upon the security level for the site 110. For example, for a site with a high security level, failure could lead the verifier component 125 to prevent the client device 120 from providing user credentials to the site 110; for a site with a low security level, the verifier component could allow user credentials to be provided to the site 110, but just log associated data (e.g., certificate data, IP address, etc.) and/or notify an administrator of the organization of the verification failure.

As another example, in some embodiments the contextual data includes the login successes of others within the organization of the client device 120. For example, in some embodiments the verification server 100 stores data about the verification attempts of various users and their organizations. Upon failure to verify the certificate of a particular third-party application site 110 for a particular user of a particular organization, the verifier component 125 determines (e.g., by consulting the verification server 100) whether other users of the same organization have had the certificate of the that third-party application site 110 successfully verified by the verification server, e.g., within some recent past time window. If so, then the verifier component 125 notifies the user of the client device 120 that others within the same organization are having successful logins (which is a possible indication that user is at a location encountering a man-in-the-middle attack).

In some embodiments, the verification server 100 includes a statistics generator 105 that logs data on the certificates provided for third-party application sites 110, and whether those certificates were determined by the verifier component 104 to be verified, and generates associated statistics. For example, in some embodiments the verification server 100 logs features corresponding to each certificate provided by the verifier component 125 to the server 100, such as an identifier of the third-party application site (e.g., the domain name of its URL), the internet protocol (IP) address of the client device 120, the location of the client device (e.g., a geolocation such as GPS coordinates, or a location derived from the IP address), and/or the current time, as well as whether the verifier component 104 determined that the certificate was verified. These logged features can then be used for purposes such as identifying factors correlated to inauthentic certificates, such as particular geolocations.

In some embodiments, the statistics generator 105 additionally stores information on the certificates that can be used to generate reports, e.g., on industry security trends. For example, the statistics generator 105 can log certificate data such as cryptographic algorithms used, keylengths, root certificate authorities (CAs) used, the frequencies at which certificates change, and the like.

Note that the verification server 100, although depicted as a single logical system in FIG. 1, may be implemented using a number of distinct physical systems and the connections between them, such as application servers, database servers, load-balancing servers, routers, and the like.

The third-party applications 110 may be created by different application developers. The third-party applications 110 are typically hosted entirely or partially on a server(s) located at a remote location from the client devices 120 and made available via a network 140, such as the Internet. In one embodiment, the third-party application's user interface is implemented in HTML or other web-based technology and is rendered within browsers of the client devices of the users, or within a custom application installed on the client devices. Although the term "third-party application" is used herein since for the typical organization the majority of applications that a user uses are authored by different organizations, it is appreciated that the "third-party applications" could also include applications created and/or hosted by organizations employing users of the client devices 120, or an organization responsible for the verification server 100.

The network 140 may be any suitable communications network for data transmission. In an embodiment such as that illustrated in FIG. 1, the network 140 uses standard communications technologies and/or protocols and can include the Internet. In another embodiment, the entities use custom and/or dedicated data communications technologies.

In some embodiments, the verification server 100 provides services in addition to page verification. For example, in one embodiment the verification server 100 provides single sign-on (SSO) services to users of the client devices 120, recording the third-party application sites 110 that are available to each user and automating user sign-on for each of the user's third-party application sites. In such embodiments, the server 100 has a user login module 108 that it uses to enable a user to log in to the server 100 (e.g., using username/password or other form of credentials, which may require multi-factor authentication), thereby establishing the identity of the user and (based on the identity of the user) the organization to which the user belongs.

In embodiments in which the server 100 provides SSO services, the server 100 additionally has an organization-user database 101 that describes properties of the different organizations to which the server 100 provides support, as well as properties of the users of those organizations. For example, in one embodiment, the database 101 stores at least, for each organization, a unique identifier of the organization, a list of unique user identifiers for the users of the organization, and unique identifiers of various third-party application sites 110 to which the organization—or groups within the organization, such as an "Accounting" group—provides access. Similarly, the database 101 stores at least, for each user of the organization, one or more indicators of the third-party application sites 110 to which that user has access. The indicators may be direct indicators of the third-party application sites 110 (e.g., a unique identifier of an application), and/or indirect indicators, such as identifiers of organization groups to which the user belongs, where the database 101 further stores identifiers of the third-party applications to which the organization groups have access.

In embodiments in which the server 100 provides SSO services, the server 100 also has an application login database 102 that specifies, for each supported third-party application site 110, configuration data that specifies the manner in which the application expects login to proceed. For example, in one embodiment in which the Security Assertion Markup Language (SAML) is used, the application login database 102 specifies, for each supported third-party application 110, an Assertion Consumer Service (ACS) URL to which a SAML assertion will be sent via HTTP POST, an identifier of an entity issuing the SAML request, and an identification of the audience for which the SAML assertion is intended. As another example, in an embodiment in which Open ID Connect (OIDC) is employed, the data for a particular login flow might store a client identifier for the application 110, a client secret indicating how the application can exchange a token via a backchannel flow, metadata (e.g., application name and/or logo), and one or more redirect URLs to which to return after the user has successfully established a session with the server 100. The application login database 102 enables the server 100 to follow the format expected by the federated sign-on protocols employed when logging in a given user to each of the user's third-party applications 110. For example, in the case of OIDC, during the flow the third-party application will provide the client identifier, a state, a nonce value, and OIDC arguments to specify the response type, and is returned a code that the application can exchange for a token to identify the user via a backchannel.

In embodiments in which the server 100 provides SSO services, the server 100 further includes a remote login service 106 that uses the application configuration data from the application login database 102 to communicate with third-party application sites 110 in order to facilitate the user login, transparently providing the users with access to the applications, even when the users are not already logged into the applications. The remote login service 106 initiates operations that effect the necessary steps for automatic SSO-based login of the user's client device 120 into the desired third-party application 110. For example, the remote login service 106 can specify a series of HTTP redirect operations as needed to obtain and verify session or other security information via cookies, to transfer the request to the third-party application, etc.

The user's client device 120 contacts the remote login service 106 as part of an attempt to login to a third-party application site 110. For example, a browser of the user's client device 120 may display a web-based user interface produced by the server 100 as a result of the user logging into the server and showing icons or other visual indications of the third-party applications 110 to which the user's organization has granted the user access; when the user clicks on or otherwise selects one of the visual indications, the browser of the client device 120 requests content for a URL of the remote login service 106 (e.g., http://login-.server.com/login?app=myapp.com/login, where login-.server.com is a domain of the server 100, and myapp.com/login corresponds to the third-party application 110).

Figure 2A:
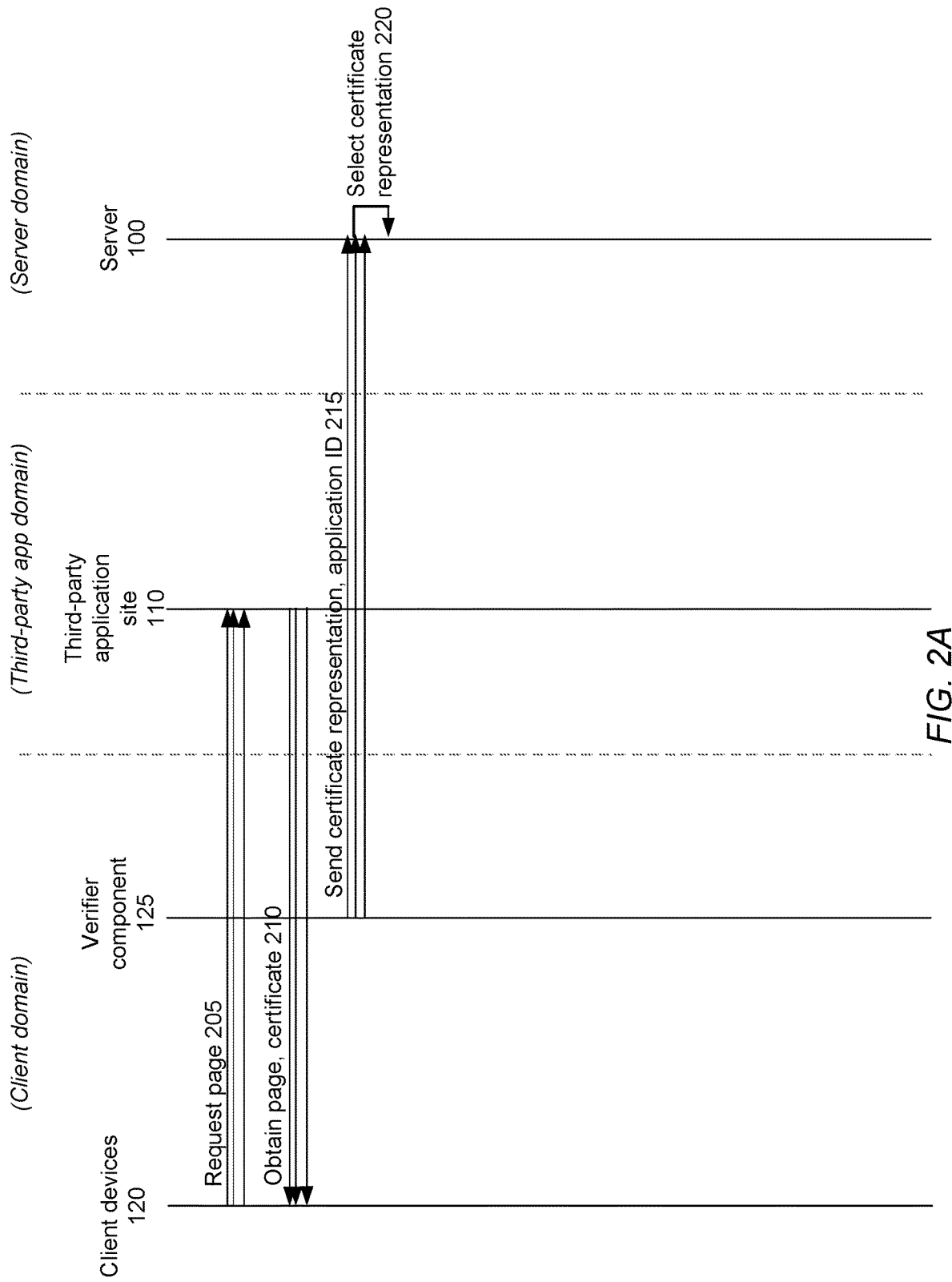
FIG. 2A illustrates a sequence of interactions between client devices of users, verifier components on the client devices, third-party application sites, and the server, during a preliminary process of learning legitimate third-party application certificates, according to one embodiment.

FIG. 2A illustrates a sequence of interactions between client devices of users, verifier components on the client devices 120, third-party application sites, and the server, during a preliminary process of learning legitimate third-party application certificates, according to one embodiment.

Client devices 120 request 205 pages of third-party application sites 110 by specifying the URLs of those pages. For example, in embodiments in which the server 100 provides SSO services, following successful login of the user to the server the server may provide links to the third-party application sites 110 that a given user is allowed to access, and user selection of those links cause the user's client device 120 to request the corresponding sites' pages.

In response to the requests, the third-party application sites 110 provide 210 the requested pages. If the pages are secure (e.g., for a login page using HTTPS), the sites 110 also provide a certificate.

The verifier component 125 sends corresponding certificate representations (e.g., the certificates themselves, or a hash such as SHA (Secure Hash Algorithm), or other fingerprint thereof) to the server 100, and an identifier of the application corresponding to the certificate (which may be part of the certificate itself).

After a sufficient number of certificate representations have been received for a given application, the certificate learning module 107 selects one or more of the certificate representations as verified certificate representations for the application and stores them in the certificate store 103.

Figure 2B:
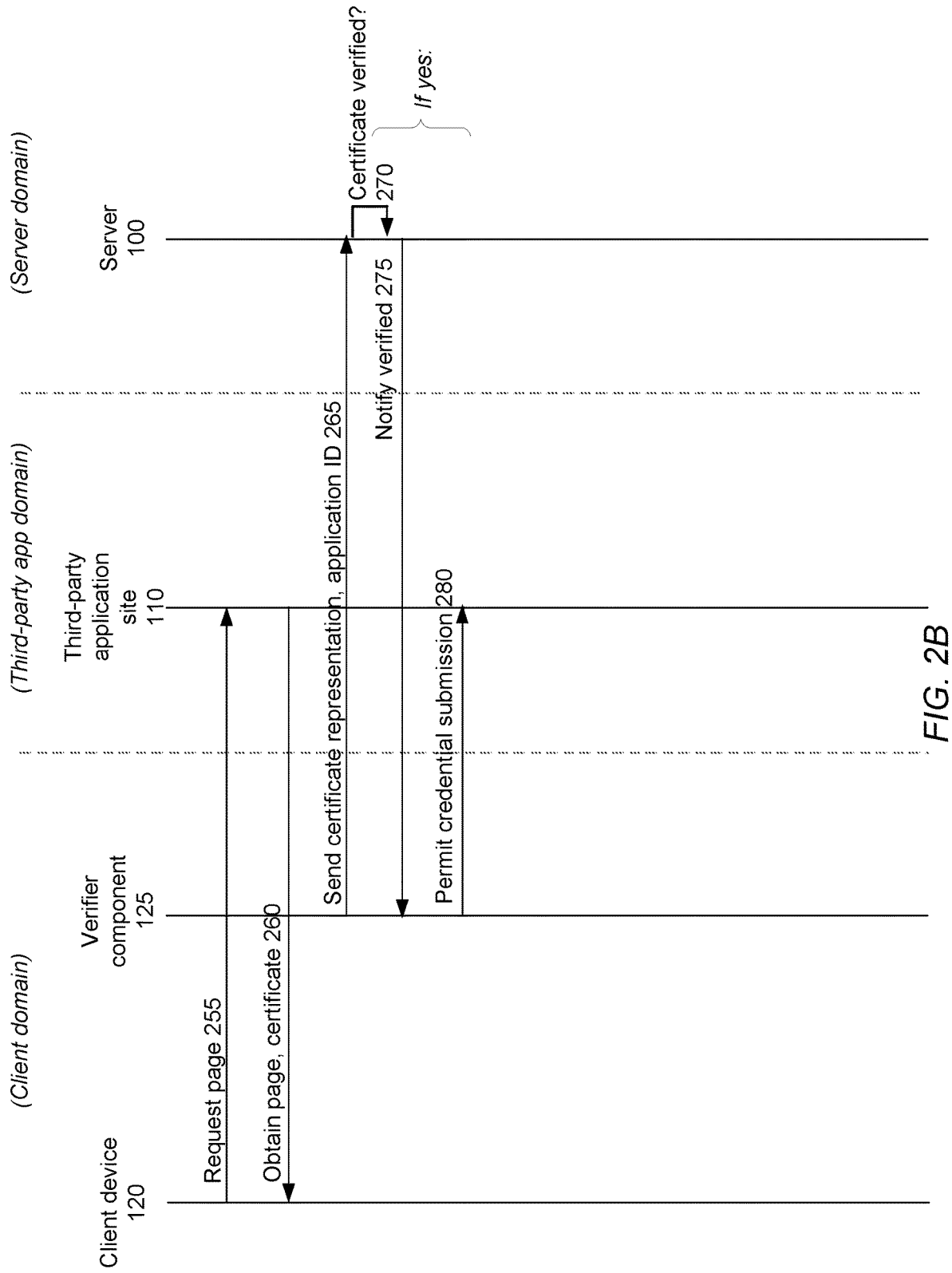
FIG. 2B illustrates a sequence of interactions between a user's client device, a verifier component on the client device, a third-party application site being accessed by the user, and the server, when authenticating the third-party application site, according to one embodiment.

FIG. 2B illustrates a sequence of interactions between a user's client device, a monitoring component on the client device, a third-party application site being accessed by the user, and the server, when authenticating the third-party application site, according to one embodiment.

A client device 120 requests 255 a page of a third-party application site, such as a login page including functionality for the submission of user credentials.

In response, the third-party application site provides 260 the requested page, and also a corresponding certificate.

The verifier component 125 of the client device 120 sends 265 a representation of the certificate, and an identifier of the application corresponding to the certificate, to the server 100. The server 100 determines whether the certificate is verified, as described above with respect to the verifier component 104 of FIG. 1. If the certificate is verified, the server 100 notifies 275 the verifier component 125 of the verification. In turn, the verifier component accordingly permits 280 submission of user credentials to the third-party application site 110.

The techniques described above provide a number of advantages over alternate possible approaches. When the certificate learning module 107 is continuously employed, the result is updating of certificate information in real-time, thereby automatically accounting for changes in application certificates without depending on certificate issuers to provide valid certificates (which could lead to certificates being updated slowly, or not at all). When the server 100 has a large user base providing certificates—e.g., as in embodiments in which the server 100 provides SSO services to the users of many organizations—the learning of verified certificates tends to be prompt and accurate.

Figure 3:
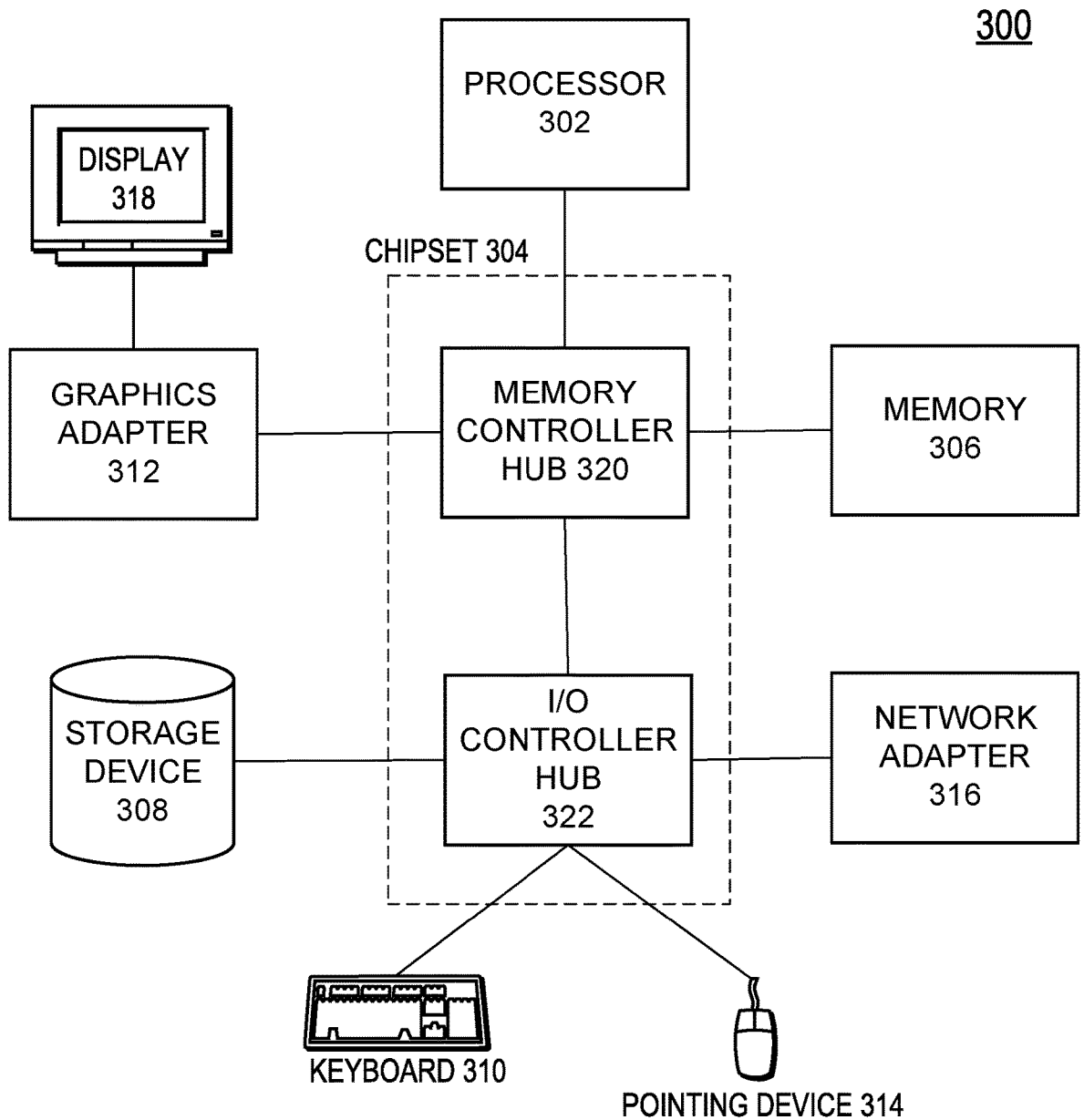
FIG. 3 is a high-level block diagram illustrating physical components of a computer used as part or all of the verification server, client device, or system providing the third-party application site, according to one embodiment.

FIG. 3 is a high-level block diagram illustrating physical components of a computer 300 used as part or all of the verification server 100, client device 120, or system providing the third-party application site 110, according to one embodiment. Illustrated are at least one processor 302 coupled to a chipset 304. Also coupled to the chipset 304 are a memory 306, a storage device 308, a graphics adapter 312, and a network adapter 316. A display 318 is coupled to the graphics adapter 312. In one embodiment, the functionality of the chipset 304 is provided by a memory controller hub 320 and an I/O controller hub 322. In another embodiment, the memory 306 is coupled directly to the processor 302 instead of the chipset 304.

The storage device 308 is any non-transitory computer-readable storage medium, such as a hard drive, compact disk read-only memory (CD-ROM), DVD, or a solid-state memory device. The memory 306 holds instructions and data used by the processor 302. The graphics adapter 312 displays images and other information on the display 318. The network adapter 316 couples the computer 300 to a local or wide area network.

As is known in the art, a computer 300 can have different and/or other components than those shown in FIG. 3. In addition, the computer 300 can lack certain illustrated components. In one embodiment, a computer 300 acting as a server may lack a graphics adapter 312, and/or display 318, as well as a keyboard or pointing device. Moreover, the storage device 308 can be local and/or remote from the computer 300 (such as embodied within a storage area network (SAN)).

As is known in the art, the computer 300 is adapted to execute computer program modules for providing functionality described herein. As used herein, the term "module" refers to computer program logic utilized to provide the specified functionality. Thus, a module can be implemented in hardware, firmware, and/or software. In one embodiment, program modules are stored on the storage device 308, loaded into the memory 306, and executed by the processor 302.

Embodiments of the entities described herein can include other and/or different modules than the ones described here. In addition, the functionality attributed to the modules can be performed by other or different modules in other embodiments. Moreover, this description occasionally omits the term "module" for purposes of clarity and convenience.

Other Considerations

The present invention has been described in particular detail with respect to one possible embodiment. Those of skill in the art will appreciate that the invention may be practiced in other embodiments. First, the particular naming of the components and variables, capitalization of terms, the attributes, data structures, or any other programming or structural aspect is not mandatory or significant, and the mechanisms that implement the invention or its features may have different names, formats, or protocols. Also, the particular division of functionality between the various system components described herein is merely for purposes of example, and is not mandatory; functions performed by a single system component may instead be performed by multiple components, and functions performed by multiple components may instead performed by a single component.

Some portions of the above description present the features of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a non-transitory computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of computer-readable storage medium suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, the present invention is not described with reference to any particular programming language. It is appreciated that a variety of programming languages may be used to implement the teachings of the present invention as described herein, and any references to specific languages are provided for invention of enablement and best mode of the present invention.

The present invention is well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the claims.

What is claimed is:

1. A non-transitory computer-readable storage medium storing executable instructions that when executed by a processor of a client device perform actions comprising:
   requesting, for a user, a web page of a third-party application website;
   receiving the web page and a corresponding certificate from the third-party application website;
   sending, to a server by a verifier component of the client device, a representation of the certificate and an identifier of the third-party application website;
   receiving an indication from the server that the representation matches a stored certificate representation of the third-party application website;
   responsive to receiving the indication, permitting, by the verifier component, credentials of the user to be provided to the third-party application website;
   requesting, for a user, a web page of a second third-party application website;

receiving the web page of the second third-party application website and a corresponding second certificate;
sending, to the server by the verifier component of the client device, a second representation of the second certificate and an identifier of the second third-party application website;
receiving a second indication from the server that the second representation fails to match a stored certificate representation of the second third-party application website; and
responsive to receiving the second indication:
  initiating a virtual private network (VPN) connection with a trusted server,
  using the VPN connection to communicate with the second third-party application website,
  receiving a third certificate from the second third-party application website,
  sending, to the server by the verifier component of the client device, a third representation of the third certificate and an identifier of the second third-party application website,
  receiving a third indication from the server that the third representation matches a stored certificate representation of the second third-party application website, and
  responsive to receiving the third indication, ceasing to use the VPN connection for communication with the second third-party application website.

2. The non-transitory computer-readable storage medium of claim 1, the actions further comprising computing a fingerprint of the certificate as the certificate representation.

3. The non-transitory computer-readable storage medium of claim 1, wherein the verifier component is a web browser plugin.

4. The non-transitory computer-readable storage medium of claim 1, wherein the client device is a smartphone, and the verifier component is a security application installed on the smartphone.

5. A computer-implemented method performed on a client device, the computer-implemented method comprising:
  requesting, for a user, a web page of a third-party application website;
  receiving the web page and a corresponding certificate from the third-party application website;
  sending, to a server by a verifier component of the client device, a representation of the certificate and an identifier of the third-party application website;
  receiving an indication from the server that the representation matches a stored certificate representation of the third-party application website;
  responsive to receiving the indication, permitting, by the verifier component, credentials of the user to be provided to the third-party application website;
  requesting, for a user, a web page of a second third-party application website;
  receiving the web page of the second third-party application website and a corresponding second certificate;
  sending, to the server by the verifier component of the client device, a second representation of the second certificate and an identifier of the second third-party application website;
  receiving a second indication from the server that the second representation fails to match a stored certificate representation of the second third-party application website; and
  responsive to receiving the second indication:
    initiating a virtual private network (VPN) connection with a trusted server, using the VPN connection to communicate with the second third-party application website,
    receiving a third certificate from the second third-party application website,
    sending, to the server by the verifier component of the client device, a third representation of the third certificate and an identifier of the second third-party application website,
    receiving a third indication from the server that the third representation matches a stored certificate representation of the second third-party application website, and
    responsive to receiving the third indication, ceasing to use the VPN connection for communication with the second third-party application website.

6. The computer-implemented method of claim 5, further comprising computing a fingerprint of the certificate as the certificate representation.

7. The computer-implemented method of claim 5, wherein the verifier component is a web browser plugin.

8. The computer-implemented method of claim 5, wherein the client device is a smartphone, and the verifier component is a security application installed on the smartphone.

9. A computer system comprising:
a computer processor; and
a non-transitory computer-readable storage medium storing executable instructions that when executed by the computer processor perform actions comprising:
  requesting, for a user, a web page of a third-party application website;
  receiving the web page and a corresponding certificate from the third-party application website;
  sending, to a server by a verifier component of the computer system, a representation of the certificate and an identifier of the third-party application website;
  receiving an indication from the server that the representation matches a stored certificate representation of the third-party application website;
  responsive to receiving the indication, permitting, by the verifier component, credentials of the user to be provided to the third-party application website;
  requesting, for a user, a web page of a second third-party application web site;
  receiving the web page of the second third-party application website and a corresponding second certificate;
  sending, to the server by the verifier component of the computer system, a second representation of the second certificate and an identifier of the second third-party application website;
  receiving a second indication from the server that the second representation fails to match a stored certificate representation of the second third-party application website; and
  responsive to receiving the second indication:
    initiating a virtual private network (VPN) connection with a trusted server,
    using the VPN connection to communicate with the second third-party application website,
    receiving a third certificate from the second third-party application website,
    sending, to the server by the verifier component of the computer system, a third representation of the third certificate and an identifier of the second third-party application website, receiving a third indication from the server that the third representation matches a stored certificate representation of the second third-party application website, and responsive to receiving the third indication, ceasing to use the VPN connection for communication with the second third-party application website.

10. The computer system of claim 9, the actions further comprising computing a fingerprint of the certificate as the certificate representation.

11. The computer system of claim 9, wherein the verifier component is a web browser plugin.

12. The computer system of claim 9, wherein the computer system is a smartphone, and the verifier component is a security application installed on the smartphone.

\* \* \* \* \*